US012632661B2

(12) United States Patent
Segev et al.

(10) Patent No.: US 12,632,661 B2
(45) Date of Patent: May 19, 2026

(54) TECHNIQUES FOR CLASSIFYING DATA USING LARGE LANGUAGE MODELS

(71) Applicant: Cyera, Ltd., Tel Aviv (IL)

(72) Inventors: Yotam Segev, New York, NY (US);
Itamar Bar-Ilan, New York, NY (US);
Yonatan Itai, Tel Aviv (IL); **Shiran
Bareli, Tel Aviv (IL); Andrey Nikitin**,
Kiryat Ono (IL); Guye Vered, Rishon
Letzion (IL); Michal Shaked, Nofit
(IL); Dvir Horovitz, Givaatayim (IL)

(73) Assignee: Cyera, Ltd., Tel Aviv (IL)

( * ) Notice: Subject to any disclaimer, the term of this
patent is extended or adjusted under 35
U.S.C. 154(b) by 155 days.

(21) Appl. No.: 18/763,531

(22) Filed: Jul. 3, 2024

(65) Prior Publication Data

US 2026/0010724 A1 Jan. 8, 2026

(51) Int. Cl.
*G06F 40/295* (2020.01)

(52) U.S. Cl.
CPC ................................. *G06F 40/295* (2020.01)

(58) Field of Classification Search
CPC ...................................................... G06F 40/295
USPC .............................................................. 704/9
See application file for complete search history.

(56) References Cited

U.S. PATENT DOCUMENTS

| | | | |
|---|---|---|---|
| 10,609,061 B2 | 3/2020 | Hagi et al. | |
| 11,165,806 B2 | 11/2021 | Hagi et al. | |
| 11,748,577 B1 | 9/2023 | Aberle | |
| 11,893,341 B2 | 2/2024 | Itani | |
| 2015/0340024 A1* | 11/2015 | Schogol | .................. G10L 15/26 704/235 |
| 2022/0222441 A1* | 7/2022 | Liu | ......................... G06F 40/35 |
| 2022/0269862 A1 | 8/2022 | Li et al. | |
| 2025/0005282 A1* | 1/2025 | Moriarty | .............. G06F 16/345 |

(Continued)

FOREIGN PATENT DOCUMENTS

| | | |
|---|---|---|
| CN | 117195911 A | 12/2023 |
| CN | 117668333 A | 3/2024 |
| CN | 117725220 A | 3/2024 |

OTHER PUBLICATIONS

"Deep entity matching with pre-trained language models." arXiv
preprint arXiv:2004.00584 (2020); Retrieved from the Internet: Li,
Yuliang, et al. Sep. 2, 2020 (Sep. 2, 2020) The whole document.

(Continued)

*Primary Examiner* — Yulin Sun
(74) *Attorney, Agent, or Firm* — M&B IP Analysts, LLC

(57) ABSTRACT

A system and method for classification. A method includes
identifying candidate entities among text data by applying at
least one entity identification rule to the text data. Inputs are
constructed based on the identified candidate entities, where
each input includes a first portion of text indicating a
candidate entity and at least one second portion of text and
where the at least one second portion of text of each input
is adjacent to the first portion of text of the input. Multiple
language models are applied to the inputs, where each
language model is trained to identify a respective set of
entities and where outputs of the language models include at
least one portion of entity-indicating text for each input.
Based on the outputs of the language models, at least one
named entity in the text data is determined.

23 Claims, 6 Drawing Sheets

(56)            References Cited

U.S. PATENT DOCUMENTS

2025/0094619 A1*   3/2025   Pasumarthi ......... G06F 21/6227

OTHER PUBLICATIONS

"Ensemble pretrained language models to extract biomedical knowledge from literature." Journal of the American Medical Informatics Association 31.9 (2024): 1904-1911; Retrieved from the Internet: Li, Zhao, et al. Mar. 24, 2024 (Mar. 24, 2024) The whole document.
"Gpt-ner: Named entity recognition via large language models." arXiv preprint arXiv:2304.10428 (2023); Retrieved from the Internet: Wang, Shuhe, et al. Oct. 7, 2023 (Oct. 7, 2023) The whole document.
International Search Report for PCT/IB2025/056411, dated Sep. 28, 2025. Searching Authority, Israel Patent Office, Jerusalem, Israel.
Written Opinion of the Searching Authority for PCT/IB2025/056411, dated Sep. 28, 2025. Searching Authority, Israel Patent Office, Jerusalem, Israel.

* cited by examiner

100A

120

125-1

125-N

110

Network

130

Name
Extractor

TECHNIQUES FOR CLASSIFYING DATA USING LARGE LANGUAGE MODELS

TECHNICAL FIELD

The present disclosure relates generally to data classification using artificial intelligence, and more specifically to classifying data using large language models.

BACKGROUND

A large language model, or LLM, is a language model configured to generate or otherwise predict subsequent tokens (e.g., tokens which are or contain words). Specifically, a LLM is a machine learning model trained on a large corpus of text and having a large number of parameters which are accounted for by the model. Many LLMs are capable of taking input text and generating responses, filling in additional details, or otherwise adding text to the input text. For example, an LLM may receive a prompt in the form of a query such as "Please write a story about a bird flying north for the winter." Outputs of the LLM may include a series of tokens, with each token being predicted based on one or more tokens which come before it in the series and based on the prompt.

While LLMs offer powerful tools for generating content, LLMs are known for having slow inference times due to the large amount of computational power needed to generate tokens. Additionally, many LLMs have a fixed and limited size context window, i.e., a window corresponding to the maximum sequence length that the model can support as an input such as 512 or 2048. In other words, each input to the model is limited, and this can result in larger portions of text needing to be input to the model as multiple sets of input data. Larger sets of unstructured text present even more challenges in terms of computational needs and limits on input size. Moreover, the large number of parameters possessed by LLMs may present challenges with respect to hardware limitations that can prevent LLMs being applied in certain contexts (e.g., on less powerful hardware).

Accordingly, using LLMs in certain contexts presents technical challenges which may hinder the effectiveness of the LLMs in those contexts. Solutions which enable or facilitate new uses of language models, and in particular which facilitate use of LLMs despite the above-noted limitations, would therefore be advantageous.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for classification. The method comprises: identifying a plurality of candidate entities among text data by applying at least one entity identification rule to the text data; constructing a plurality of inputs based on the identified plurality of candidate entities, wherein each input includes a first portion of text indicating a candidate entity from among the plurality of candidate entities and at least one second portion of text, wherein the at least one second portion of text of each input is adjacent to the first portion of text of the input; applying a plurality of language models to the plurality of inputs, wherein each language model is trained to identify a respective set of at least one entity, wherein outputs of the plurality of language models include at least one portion of entity-indicating text for each input; and determining, based on the outputs of the plurality of language models, at least one named entity in the text data.

Certain embodiments disclosed herein also include a non-transitory computer readable medium having stored thereon causing a processing circuitry to execute a process, the process comprising: identifying a plurality of candidate entities among text data by applying at least one entity identification rule to the text data; constructing a plurality of inputs based on the identified plurality of candidate entities, wherein each input includes a first portion of text indicating a candidate entity from among the plurality of candidate entities and at least one second portion of text, wherein the at least one second portion of text of each input is adjacent to the first portion of text of the input; applying a plurality of language models to the plurality of inputs, wherein each language model is trained to identify a respective set of at least one entity, wherein outputs of the plurality of language models include at least one portion of entity-indicating text for each input; and determining, based on the outputs of the plurality of language models, at least one named entity in the text data.

Certain embodiments disclosed herein also include a system for classification. The system comprises: a processing circuitry; and a memory, the memory containing instructions that, when executed by the processing circuitry, configure the system to: identify a plurality of candidate entities among text data by applying at least one entity identification rule to the text data; construct a plurality of inputs based on the identified plurality of candidate entities, wherein each input includes a first portion of text indicating a candidate entity from among the plurality of candidate entities and at least one second portion of text, wherein the at least one second portion of text of each input is adjacent to the first portion of text of the input; apply a plurality of language models to the plurality of inputs, wherein each language model is trained to identify a respective set of at least one entity, wherein outputs of the plurality of language models include at least one portion of entity-indicating text for each input; and determine, based on the outputs of the plurality of language models, at least one named entity in the text data.

Certain embodiments disclosed herein include the method, non-transitory computer readable medium, or system noted above, further including or being configured to perform the following step or steps: identifying at least one entity-indicating term within the text data by applying a truth table to the text data, wherein the truth table includes a plurality of columns representing a set of factors and a column including a plurality of score outputs, wherein the plurality of candidate entities are identified based on the identified at least one entity-indicating term.

Certain embodiments disclosed herein include the method, non-transitory computer readable medium, or system noted above, further including or being configured to perform the following step or steps: marking the first portion of text indicating the candidate entity for each input based on the results of applying the truth table to the text data, wherein the plurality of inputs are constructed based further on the marked first portion of text for each input.

Certain embodiments disclosed herein include the method, non-transitory computer readable medium, or system noted above, further including or being configured to perform the following step or steps: matching, for each input, between the candidate entity of the input and the at least one classification for the input in order to determine a distance between the candidate entity and each of the at least one classification for each input, wherein the at least one named entity is determined based further on the distance determined for each input.

Certain embodiments disclosed herein include the method, non-transitory computer readable medium, or system noted above, wherein the matching includes comparing each distance to a threshold.

Certain embodiments disclosed herein include the method, non-transitory computer readable medium, or system noted above, further including or being configured to perform the following step or steps: training the plurality of language models using a plurality of sets of training data, wherein the set of training data used to train each language model includes a plurality of training inputs and a plurality of corresponding training task outputs of the at least one entity of each language model, wherein each training input includes a first portion of training text indicating a training candidate entity and at least one second portion of training text which is adjacent to the first portion of training text.

Certain embodiments disclosed herein include the method, non-transitory computer readable medium, or system noted above, further including or being configured to perform the following step or steps: adding a plurality of task prefixes to the plurality of training inputs, wherein the plurality of language models is trained using the plurality of training inputs with the added plurality of task prefixes.

Certain embodiments disclosed herein include the method, non-transitory computer readable medium, or system noted above, wherein the plurality of language models is a plurality of first language models, further including or being configured to perform the following step or steps: labeling the plurality of training inputs with the plurality of corresponding training task outputs, wherein labeling the plurality of training inputs further includes applying at least one second language model to the plurality of training inputs.

Certain embodiments disclosed herein include the method, non-transitory computer readable medium, or system noted above, wherein the at least one second language model is a plurality of second language models, further including or being configured to perform the following step or steps: applying the plurality of second language models in a voting process, wherein outputs receiving a majority of votes from the plurality of second language models are used as the plurality of corresponding training task outputs for labeling the plurality of training inputs.

Certain embodiments disclosed herein include the method, non-transitory computer readable medium, or system noted above, wherein each language model is trained using a respective set of training text inputs, wherein each language model is configured to only generate text predictions from among the respective set of training text inputs used to train the language model.

Certain embodiments disclosed herein include the method, non-transitory computer readable medium, or system noted above, wherein each language model is fine-tuned only for entity extraction.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1A:
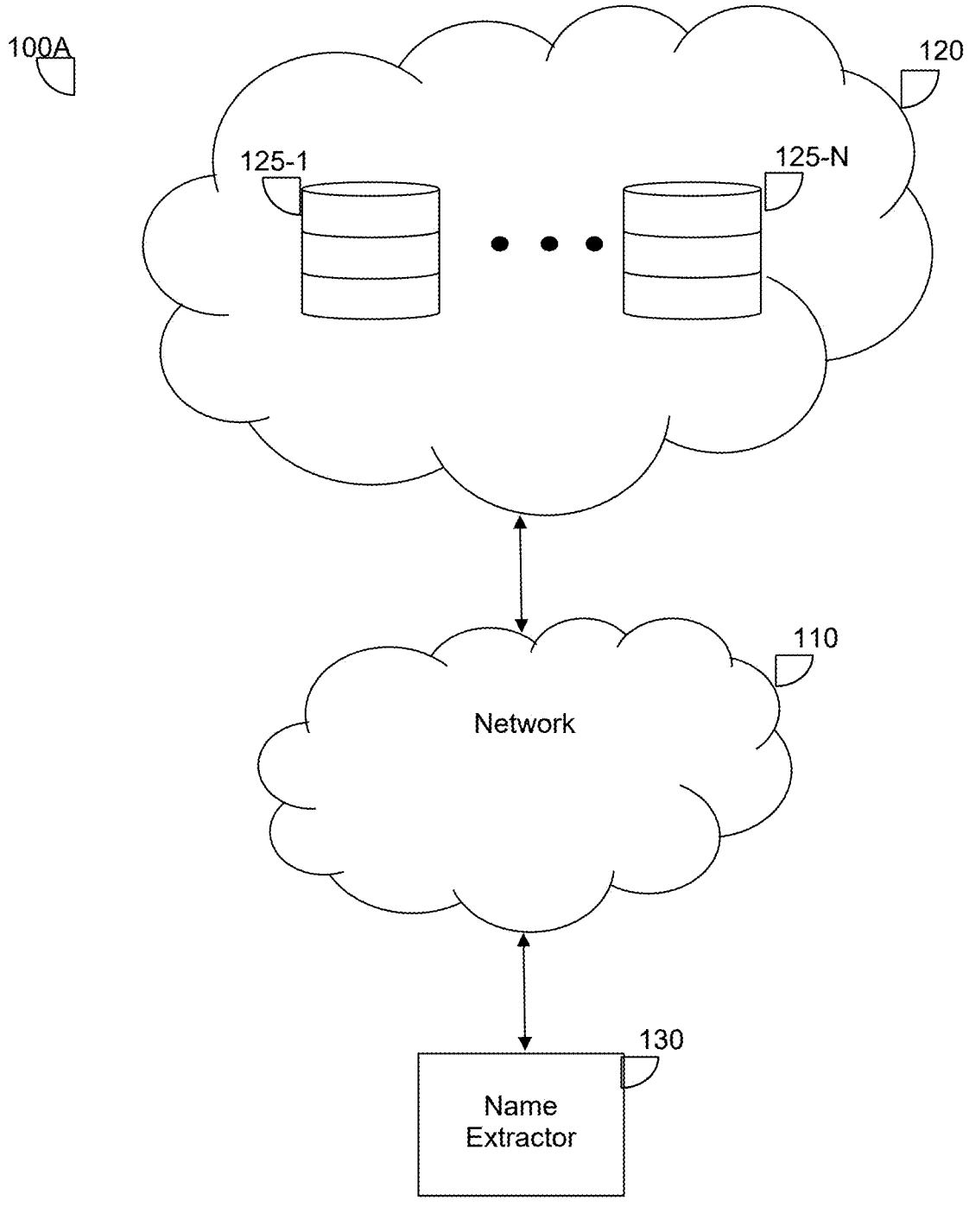
FIG. 1A is a network diagram utilized to describe various disclosed embodiments.

The various disclosed embodiments include a method and system for classifying data using generative artificial intelligence (AI) models and, more specifically, various embodiments classify data using language models such as large language models (LLMs). In particular, various disclosed embodiments may be utilized to perform named-entity recognition (NER) tasks to locate and classify named entities in unstructured text.

In an embodiment, a classification process includes training one or more models to perform classification and then applying the trained models in order to classify data. More specifically, in accordance with various disclosed embodiments, each model is a generative AI model such as a LLM or other language model, and each model is applied to text data which may include unstructured text in order to perform NER classification, i.e., classifying certain portions of data as indicating named entities.

In a further embodiment, post-processing is performed on the results of the models in order to filter redundant results. In some embodiments, the post-processing includes matching between candidate entities of the contextual inputs and outputs of the models. More specifically, the matching may include determining distances (for example, edit distances such as Levenshtein distances), and the final classifications only include classification outputs whose distances from their respective contextual inputs are below a threshold (e.g., a predetermined threshold). Specifically, each candidate entity is a portion of text which may indicate a respective named entity.

Based on the outputs of the models, named entities within the data are identified. The identification of the named entities may be used for purposes such as, but not limited to, further classifying data in a computing environment (for example, classifying data into roles based on named entities identified in the data), securing a computing environment based on classifications, organizing or otherwise storing data based on the classifications, combinations of these, and the like.

In an embodiment, the training of each model begins using a base model as a backbone. Training contextual inputs are constructed from data to be used for the training.

The training contextual inputs may be constructed using a heuristic analysis to identify candidate entities and surrounding text to be used in the construction. The resulting contextual inputs may be, for example, sentence-length input texts each containing text indicating an entity as well as surrounding text before and after the entity-indicating text. Task prefixes may be combined with or otherwise added to the contextual inputs. The task prefixes may correspond to respective entities or groups of entities and be used, for example, in order to fine tune different models to provide more accurate outputs for a particular entity. Models are trained using the contextual inputs and the added task prefixes.

In some embodiments, multiple models corresponding to respective entities are trained, for example by using only data having task prefixes of the corresponding entity for a given model in order to train that model. In this regard, it is noted that certain kinds of AI models such as LLMs have a very large size in order to allow for solving a wide variety of potential text-based problems, but that such large models may be unsuitable for certain uses such as operating on standard cloud-based hardware or other systems which are not capable of maintaining performance while running large models. It is also noted that a general purpose LLM may not perform much better or may not perform better at all when applied to a specific task as compared to more specialized models.

Models fine-tuned as described herein using a much smaller set of parameters (as a non-limiting example, around 1 billion parameters) can achieve comparable or better performance than general purpose models with hundreds of billions of parameters. Accordingly, fine tuning models to specific tasks (i.e., tasks of recognizing respective entities) allows for conserving computing resources and running the relatively small models on less powerful hardware. Additionally, models trained as described herein can be scaled more efficiently, thereby improving scalability of services using these models. Even further, these smaller models (i.e., models with fewer parameters) can be trained more efficiently, thereby conserving computing resources even during the training.

In an embodiment, the model is applied in a two-phase classification process. In a further embodiment, a high recall first phase of classification is followed by a high precision second phase of classification. Moreover, the two-phase classification may be followed by a post-processing phase in which overlap between classifications is checked in order to verify the classifications resulting from the two-phase classification process, thereby avoiding potential redundant classification suggestions (for example, because every candidate is checked only once).

In the first phase, candidate entities in language content are marked along with the surrounding context before and after appearance of words mentioning the respective entities in order to construct inputs for the second phase. The first phase may utilize one or more heuristics for criteria such as, but not limited to, regular expressions, support terms, and entity-specific dictionaries. The heuristics may be predetermined heuristics designed in order to yield a high percent coverage (e.g., above a threshold) such that the first phase achieves high recall. Each resulting constructed input may be, for example but not limited to, a sentence-length input. More specifically, the constructed inputs are contextual inputs which include text of candidate entities and surrounding text (e.g., text meeting certain heuristic criteria with respect to the candidate entity text).

In the second phase, classification is performed on the constructed inputs created in the first phase. More specifically, the constructed inputs are input to a language model such as, but not limited to, a LLM, for classification. By only running the classification on these inputs rather than the entire set of language content or evenly divided portions of the entire set of language content, the amount of data which is processed by the classifier model can be reduced by orders of magnitude, thereby allowing for scaling classification with high precision.

As noted above, LLMs tend to have slow inference times because of the large amount of computational power needed to generate tokens to be utilized for a given task. Additionally, such models often only support very limited context windows (e.g., with a maximum sequence length of a relatively low value such as 512 or 2048). Accordingly, supporting use of generative AI models such as LLMs in settings with unstructured documents, the disclosed embodiments provide techniques which enable processing relatively long and unstructured documents using smaller sequences without stripping potential model inputs on relevant meaning which would harm the accuracy of the resulting outputs of the model. At least some disclosed embodiments allow for scaling the amount of documents which may be effectively classified from a few thousand documents in a day to potentially millions of documents in a day.

Some other techniques include techniques for automating data labeling using language models. More specifically, in some embodiments, multiple LLMs are applied to inputs (for example, the contextual inputs described above), and a voting process is conducted using the outputs of the LLMs. If consent is reached among the LLMs for a given input, then the input is labeled accordingly. For example, when a majority of the LLMs output the same classification for the input, then the classification output by that majority of LLMs is used as the label for that input. In some versions, if there is no consensus (for example, if no classification receives a majority of votes), then a negative label or no label may be applied for that input. Alternatively, the inputs for which consensus was not achieved may be provided to a human operator for manual labeling without needing to provide all of the inputs for manual labeling.

FIG. 1A shows an example network diagram 100A utilized to describe various disclosed embodiments. In the example network diagram 100, a name extractor 130 communicates with components in a cloud environment 120 via a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

As shown in FIG. 1A, the cloud environment 120 includes various disks 125-1 through 125-N (hereinafter referred to individually as a disk 125 or collectively as disks 125 for simplicity). The disks 125 may be, but are not limited to, hard drive disks, virtual disks, and the like. Some of the disks 125 may contain data stores (not depicted in FIG. 1A) and therefore data in such data stores may need to be classified in order to provide certain security features to protect those data stores. To this end, the name extractor 130 is configured to analyze data in the cloud environment 120 as described herein in order to identify which portions of data among the disks 125 belong to certain classifications, to act to secure the computing environment 120 based on such classifications, both, and the like.

Figure 1B:
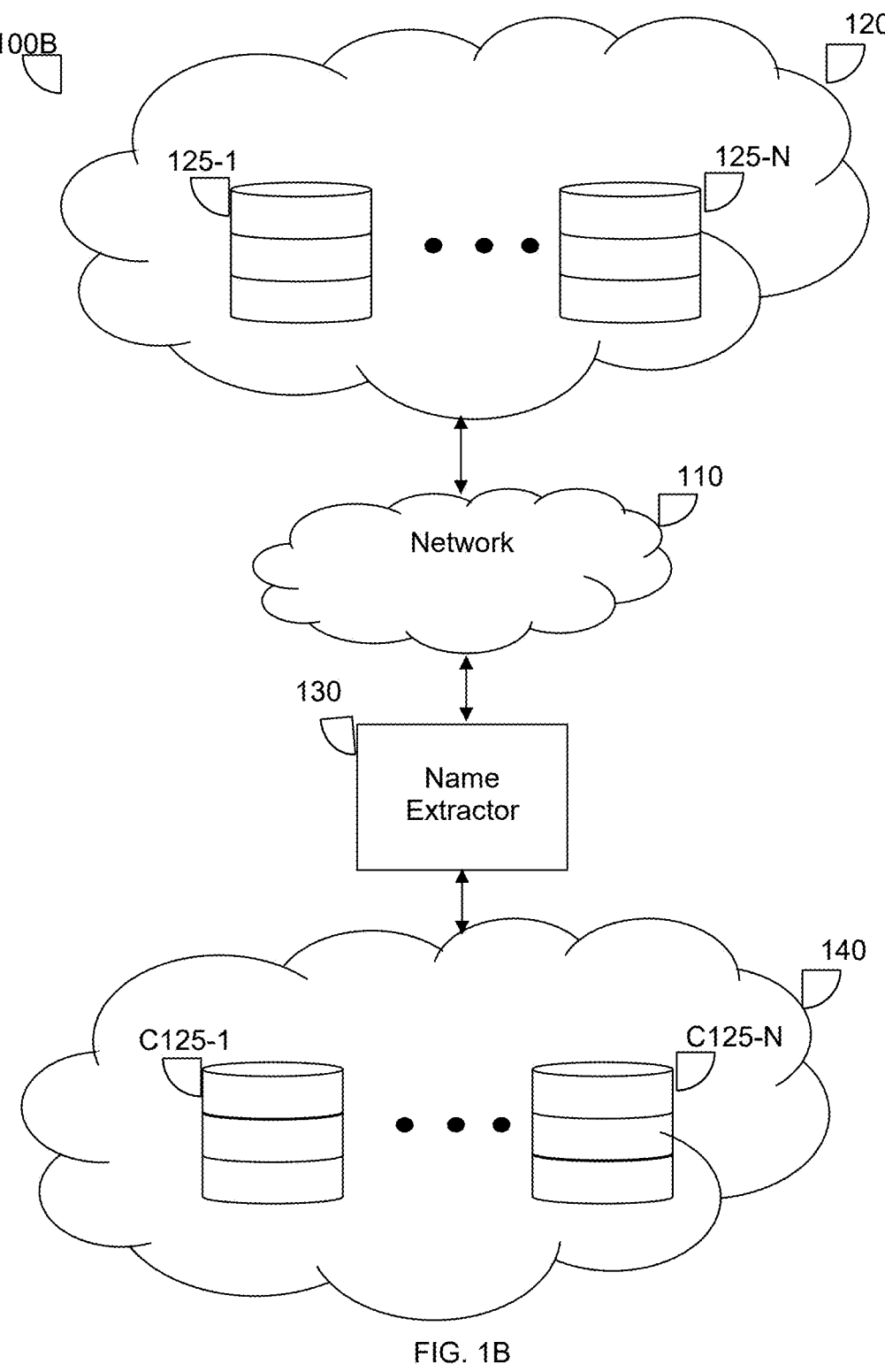
FIG. 1B is a network diagram illustrating a deployment featuring copies of disks utilized to describe various disclosed embodiments.

FIG. 1B further shows disk copies C125-1 through C125-N (hereinafter referred to as disk copies C125 for simplicity) that are copies of respective disks 125 which may be created in order to facilitate classification in accordance with some embodiments. The disk copies C125 are created and connected to engines (not shown) run via the name extractor 130, for example via one or more virtual machines running on the name extractor 130. The disk copies C125 may be deployed in, for example, a cloud computing environment 140. Example techniques for copying disks which may be used to more efficiently scan disks (and, consequently, more efficiently classify data identified via such scans) are described further in U.S. patent application Ser. No. 17/647,899, assigned to the common assignee, the contents of which are hereby incorporated by reference.

It should be noted that a single name extractor 130 is depicted for simplicity purposes, but that classification systems may be utilized without departing from the scope of the disclosure. Each classification system may run one or more virtual machines, each virtual machine being configured with one or more engines as described herein.

Figure 2:
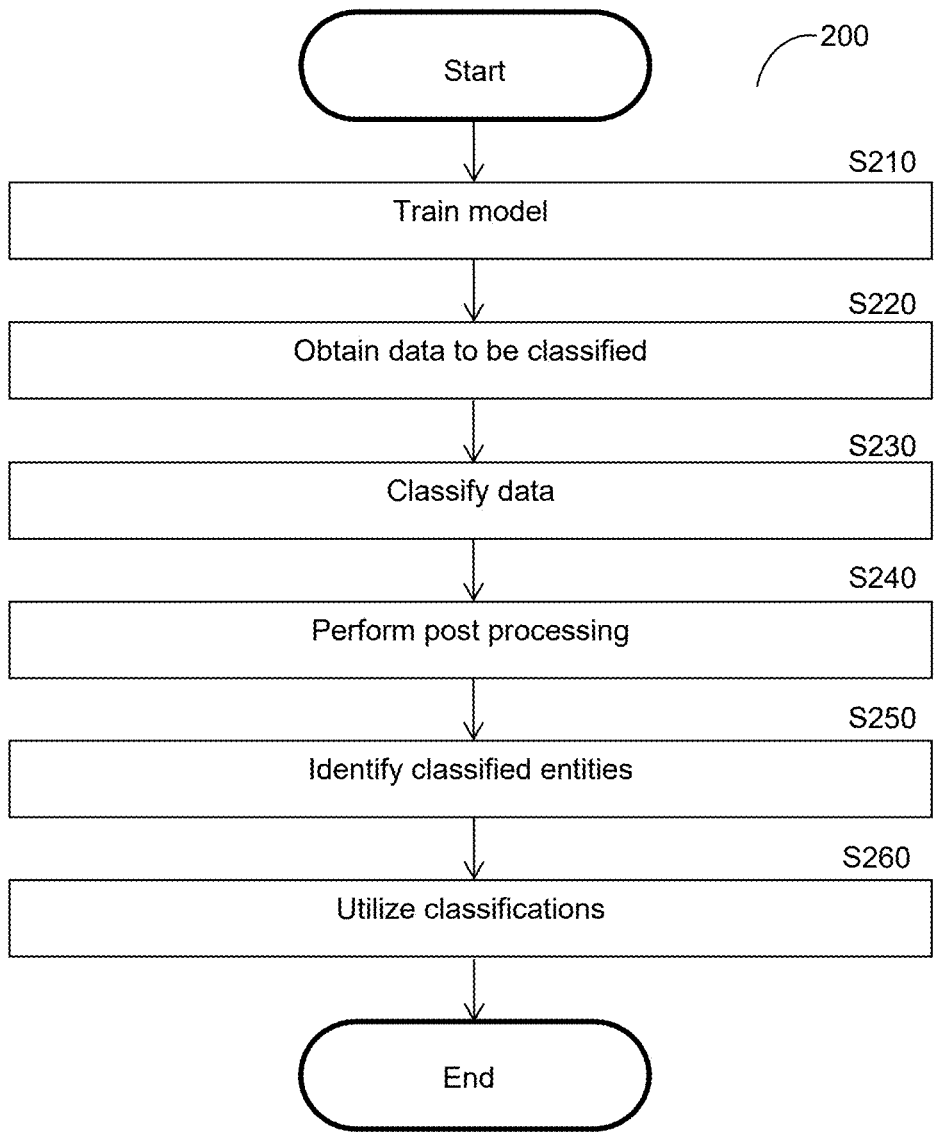
FIG. 2 is a flowchart illustrating a method for classifying data using large language models according to an embodiment.

FIG. 2 is a flowchart 200 illustrating a method for classifying data using large language models according to an embodiment. In an embodiment, the method is performed by the name extractor 130, FIG. 1.

At S210, one or more models are trained. More specifically, language models to be used for classification as described herein are trained. In an embodiment, the models to be trained include or are encoder-decoder based transformers configured to perform text-to-text activities, specifically generating text using text-to-text. Such models may be trained using training sets including pairs of inputs and outputs (i.e., outputs used to label corresponding inputs) for a given problem. To this end, in an embodiment, the models are trained using combinations of text inputs and text outputs, with each text input including or being a text sample and the output corresponding to each output being a portion of text representing a named entity in the text input.

In an embodiment, the models are trained using training contextual inputs, where each training contextual input includes a first portion of text indicating an entity (also referred to as entity-indicating text) and one or more second portions of surrounding text (i.e., text surrounding the first portion of text). In a further embodiment, the training contextual inputs are labeled using task prefixes used to further guide fine-tuning of the models for specific tasks.

The resulting models may be trained for entity identification and, more specifically, for named entity recognition (NER). That is, given an input sample of text containing text representing a named entity which the model is trained to identify, each model is configured to identify the named entity text within that input sample and, accordingly, to recognize that the sample contains one of the named entities the model is trained to identify. The models may further be trained to output a type of entity, for example but not limited to, a predetermined type of entity known to be associated with respective named entities such as "person," "company," and the like. As a non-limiting example, for a model trained to at least identify the named entity "John Wick" within unstructured text, an input text sample "of all the people working there, only John Wick was missing from" would yield an output "PERSON: ['John Wick']" which identifies the named entity "John Wick" within the input text sample, and may be optionally used to further determine the other portions of the text sample (e.g., "of all the people working there, only" and "was missing from") as surrounding text.

In an embodiment, the models are trained as described further below with respect to FIG. 3.

At S220, data to be classified is obtained. In an embodiment, the obtained data includes textual data and, more specifically, textual data which may indicate entities such as, but not limited to, persons, organizations, companies or other legal entities, teams, and the like. As discussed herein, various embodiments are utilized to classify portions of the textual data as either indicating named entities (e.g., specific individuals, groups, legal entities, etc.) or as not indicating named entities (e.g., either not indicating an entity at all or indicating an entity referred to using a generic term such as "person" or "company" that does not indicate a specific individual, group, or legal entity).

The data to be classified may be or may include, but is not limited to, data stored in one or more storages within a computing environment (e.g., the computing environment 120, FIGS. 1A-B). The data may be or may include potentially sensitive data such as, but not limited to, medical records, credit card information, personally identifiable information, combinations thereof, and the like. Accordingly, classifying the data, and more specifically identifying certain named identities within the data, may aid in taking appropriate security measures to protect certain kinds of data. Moreover, recognizing that security resources are limited, classifying data in this way may further help to effectively prioritize use of resources in securing data.

At S230, the data is classified. In an embodiment, classifying the data includes applying one or more of the trained models in order to produce one or more outputs including identifications of named entities within text among the data. To this end, classifying the data may include constructing text sample inputs, for example in the form of contextual inputs, to be input to the models, where each model is configured to identify one or more named entities within such text sample inputs as discussed herein. The outputs of each of the models as applied to a given input may therefore include text or portions thereof representing one or more entities indicated among the input.

In an embodiment, the data is classified in a two-phase classification process including a first phase and a second phase. In a further embodiment, the first phase may be a high recall phase, and the second phase may be a high precision phase. As described further herein, this two-phase process may be utilized to overcome technical challenges related to applying certain kinds of models such as, but not limited to, limits on token size, speed of processing, computational resources utilized for processing, combinations thereof, and the like. An example process for two-phase classification which may be utilized in accordance with various disclosed embodiments is discussed further below with respect to FIG. 4.

At S240, post-processing is performed based on the outputs of the models. The post-processing may be performed with respect to the outputs of the models in order to filter redundant results from further processing. As noted above, in some implementations, some or all of the models may output multiple named entities within a given input text sample (e.g., within a given contextual input). By filtering redundant results, potentially redundant classification suggestions may be avoided. In other words, filtering redundant results may ensure that each candidate entity is only checked once after the first phase of classification, thereby further conserving computing resources in subsequent processing such as during the second phase of classification.

In some embodiments, filtering the redundant results includes matching between candidate entities of the contextual inputs and outputs of the models. More specifically, the matching may include determining distances (for example, edit distances such as Levenshtein distances), and the final classifications only include classification outputs whose distances from their respective contextual inputs are below a threshold (e.g., a predetermined threshold). Specifically, each candidate entity is a portion of text which may indicate a respective named entity within a given contextual input. The final classifications may therefore be outputs which match inputs with respect to these candidate entities, for example outputs which have a distance from their respective inputs below the threshold.

At S250, entities are identified based on the results of the data classification and any post-processing of those results. More specifically, entities identified via respective outputs are identified as the entity for respective inputs (e.g., contextual inputs or other text sample inputs). When the results are post processed, potentially redundant outputs may be filtered out such that multiple entities are not identified for any given input.

At S260, the classifications are utilized. In an embodiment, utilizing the classifications includes performing one or more actions with respect to one or more data stores in which the classified data is stored, computing environments in which those data stores are deployed, systems or programs which might interact with the classified data, cybersecurity tools used to secure the classified data, combinations thereof, and the like. The actions may include, but are not limited to, cybersecurity actions (e.g., mitigation or remedial actions), data organization actions (e.g., linking, grouping, or otherwise organizing data with respect to classifications), utilizing data to learn about computing environments (e.g., for posture management), and the like.

In an embodiment, utilizing the classifications includes acting to secure a computing environment (e.g., the cloud environment 120, FIGS. 1A-B) based on the classifications. To this end, in such an embodiment, one or more actions are taken to secure the cloud environment using the determined classifications. In an embodiment, the actions include modifying one or more components in the cloud environment based on the classifications of entities indicated among data stored in each component. More specifically, each component may be modified to meet one or more cybersecurity requirements with respect to the classification of the entities indicated among different portions of the data stored in the component.

In another embodiment, utilizing the classifications may include monitoring behavior of components in the cloud environment in order to detect abnormal behaviors as potential cybersecurity threats and performing mitigation actions with respect to the detected abnormal behaviors. Specifically, the abnormal behaviors include modifying, deleting, or otherwise accessing data in one of the data stores, where the circumstances surrounding the access are unexpected for data including text representing the classifications stored in the data store. The abnormal behaviors may be detected using a predetermined policy defining normal behaviors, abnormal behaviors, or both, with respect to different classifications of entities. In a further embodiment, the mitigation actions may be prioritized based on the classifications, i.e., such that certain mitigation actions are prioritized over others and computing resources may be prioritized in order to perform the higher priority mitigation actions before lower priority mitigation actions when necessary (e.g., when insufficient resources are available to perform all mitigation actions at once). For example, rules defining certain classifications of entities which are likely to be linked to more sensitive data may prioritize data including text having those classifications over other data.

Figure 3:
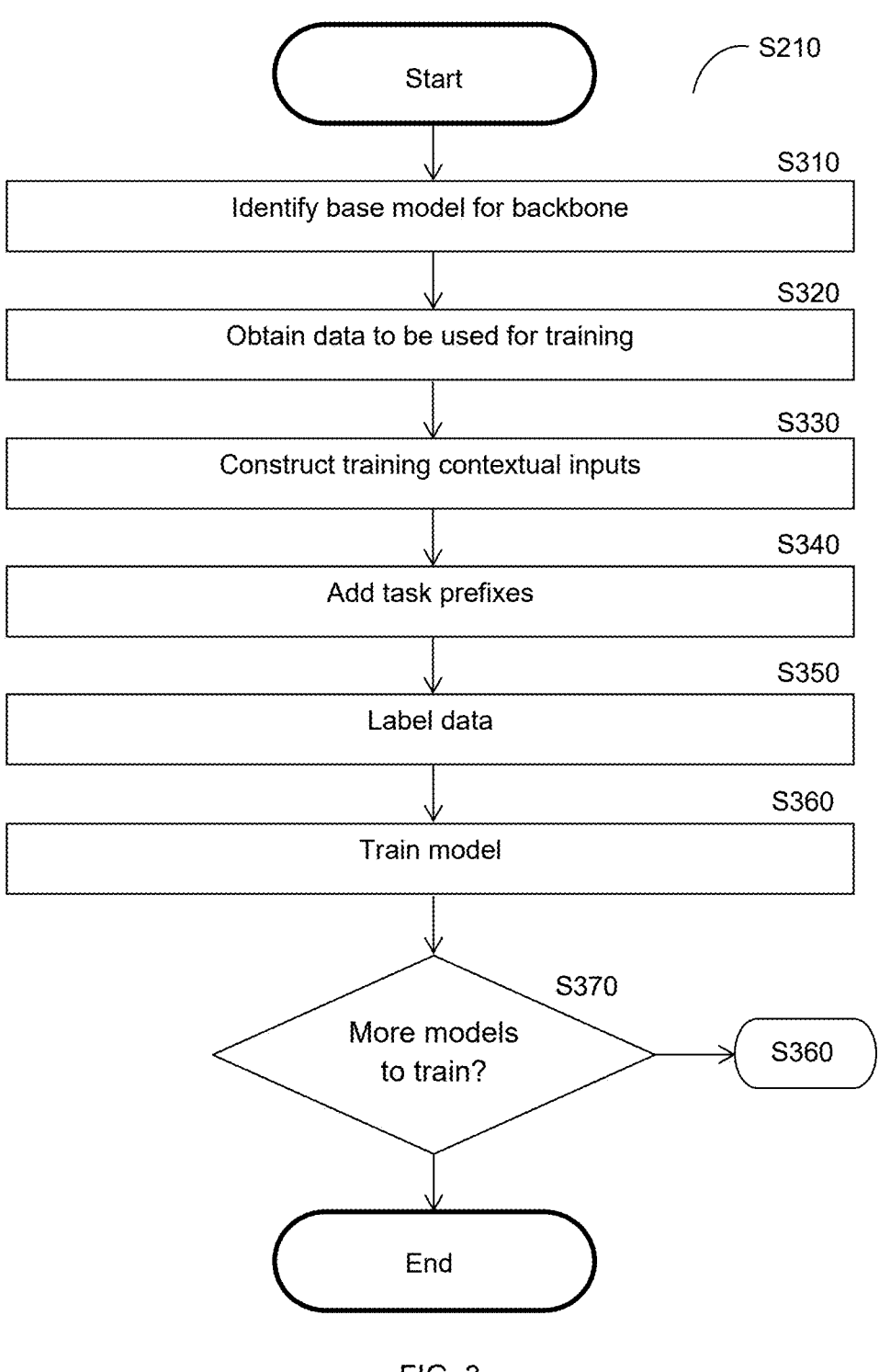
FIG. 3 is a flowchart illustrating a method for training a large language model using labeled data according to an embodiment.

FIG. 3 is a flowchart S210 illustrating a method for training a language model using labeled data according to an embodiment.

At S310, a base model to be used as a backbone is identified. The backbone acts as a starting point for training. That is, the backbone is an untrained or previously trained model which is configured to perform a particular task or sub-task. During the training, the base model is trained using training data including training inputs and training outputs, where each of the training inputs and the training outputs may be a portion of text. The base model is trained to output text, for example text from among the training outputs, when applied to an input portion of text. The result is a trained model trained to identify one or more entities among input text and to output text indicating the entities which are identified within the input text.

The base model may be a previously trained language model and, optionally, a previously fine-tuned language model, which is configured to perform language-based tasks as discussed herein. In some implementations, the base model may be an open-source language model which is pre-trained to generate predictions (e.g., predictions of text in the form of subsequent tokens) based on input textual content.

In an embodiment, the base model is a text generator model configured to generate output text based on input text. In a further embodiment, the base model is a transformer model. In yet a further embodiment, the base model is a transformer-based encoder-decoder model which utilizes an encoder-decoder configuration. Such a configuration includes an encoder and a decoder, where the encoder is configured to map an input sequence (e.g., an input sequence of text) to a set of representations. The set of representations is fed to the decoder, which in turn produces text outputs. The encoder includes encoding layers configured to generate contextualized token representation, with each such representation corresponding to an input token that combines information from other input tokens.

As noted above, such a transformer model may be trained using training data including training inputs (e.g., text inputs) and corresponding training outputs (e.g., in the form of labels of text outputs for respective text inputs). In accordance with various disclosed embodiments, the training inputs include contextual inputs made up of candidate entities and surrounding text, and the corresponding training outputs include text representing named entities indicated by the respective contextual inputs.

When multiple models are to be trained (for example, but not limited to, when each model is trained for a respective entity), the base model may be the same base model for all models to be trained, or different base models may be used as the starting point for different models. FIG. 3 depicts an implementation in which the same base model is used to train multiple models and, as a result, FIG. 3 does not depict iteratively identifying the base model. However, at least some embodiments are not limited as such, and may include identifying different base models for training models at different iterations of the process.

In a further embodiment, the base model to be trained is further configured with one or more guardrails in the form of predetermined output classification rules. Such predetermined output classification rules may define restrictions on potential outputs which may be provided by the model and may be applied to any trained versions of the base model. In yet a further embodiment, the output classification rules restrict outputs of the model to only include outputs among the training outputs used to train the model (e.g., from among a predetermined set of training outputs).

In this regard, it is noted that generative text models such as LLMs present technical challenges in the form of hallucinations, meaning that the model may generate random, incorrect, or otherwise inaccurate results that deviate from a normal or otherwise expected result. These hallucinations may affect accuracy of classifications and other activities which utilize these kinds of models. Additionally, generative models trained in accordance with at least some existing solutions may generate text based on the training inputs rather than the training outputs. Generating text based on such inputs may lead to security and privacy risks in contexts where output classifications are desired and the training inputs may include sensitive or potentially identifying data. Introducing guardrails which prevent outputs of the model from deviating from the training outputs ensures that no input data is leaked into the model outputs, thereby avoiding potential issues with inaccurate or unrecognized classifications as well as certain security and privacy issues.

At S320, data to be used for training is obtained. In an embodiment, the obtained data includes textual data and, more specifically, textual data which may indicate entities such as, but not limited to, persons, organizations, companies or other legal entities, teams, and the like. As discussed herein, various embodiments are utilized to classify portions of the textual data as either indicating named entities (e.g., specific individuals, groups, legal entities, etc.) or as not indicating named entities (e.g., either not indicating an entity at all or indicating an entity referred to using a generic term such as "person" or "company" that does not indicate a specific individual, group, or legal entity).

In some implementations, the data to be used for training may be or may include, but is not limited to, data stored in one or more storages within a computing environment (e.g., the computing environment 120, FIGS. 1A-B). The data may be or may include potentially sensitive data such as, but not limited to, medical records, credit card information, personally identifiable information, combinations thereof, and the like. Accordingly, classifying the data, and more specifically identifying certain named identities within the data, may aid in taking appropriate security measures to protect certain kinds of data. Moreover, recognizing that security resources are limited, classifying data in this way may further help to effectively prioritize use of resources in securing data.

At S330, training contextual inputs are constructed using the obtained data. In an embodiment, each training contextual input includes a first portion of text which indicates an entity and at least one second portion of text including surrounding text for the first portion of text.

In a further embodiment, the training contextual inputs are constructed using a heuristic analysis in order to identify text including candidate entities (i.e., nouns or other words which might represent an entity) and surrounding text. The heuristics analysis may include applying one or more entity-indicating text identification rules. Such entity-indicating text identification rules are defined with respect to one or more factors such as, but not limited to, predetermined words or terms (e.g., words or terms known to indicate entities), capitalization (e.g., a capitalized word may be more likely to indicate an entity), sentence structure, combinations thereof, and the like.

In a further embodiment, a second portion of text is surrounding text for a first portion of text when the second portion of text is located before or after the first portion of text. In yet a further embodiment, the second portion of text is surrounding text for the first portion of text when it is adjacent to the first portion of text within a set of unstructured text, i.e., the second portion of text is adjacent to the first portion of text when no other portions of text are between the first portion of text and the second portion of text. In still a further embodiment, the surrounding second portion of text for a given first portion of text includes a threshold amount of text (e.g., as defined with respect to a predetermined number of characters, words, etc.) which appears adjacent to the first portion of text. As a non-limiting example, a second portion of text may include 25 characters which appear either immediately before or immediately after the first portion of text within unstructured text.

In an embodiment, the training contextual inputs are limited size inputs including text which is at most equal to a threshold length, for example but not limited to, a predetermined threshold length defined with respect to a number of characters or a number of words. In a further example, the training contextual inputs are constructed such that each training contextual input is a sentence length subset of text, where sentence-length may be defined based on factors such as, but not limited to, an average number of characters in a sentence, an average number of spaces between words in a sentence, and the like.

At S340, task prefixes are added to the training contextual inputs in order to create a set of prefix-added training contextual inputs. The task prefixes may correspond to respective entities or types of entity names (e.g., full name vs. given or last name) and be used, for example, in order to fine tune different models to provide more accurate outputs for a particular task. As a non-limiting example, for a full name NER task which involves determining a full name of a named entity, the task prefix "ner_full_name" may be concatenated to the training contextual inputs including text representing full names in order to further improve the model when recognizing full names specifically.

In an embodiment, at each iteration of the process including training a different model, a different set of task prefixes is added to the training contextual inputs in order to create a respective set of prefix-added training contextual inputs to be used to train that model. In a further embodiment, the set of task prefixes added to the training contextual inputs is used only to train one model among the models to be trained. Accordingly, different models may be trained using different task prefixes in order to fine-tune the models for different tasks. In yet a further embodiment, the different tasks corresponding to the different task prefixes to be used for training different models are sub-tasks of a broader entity identification task. That is, in such an embodiment, each model is trained using a respective set of task prefixes corresponding to a specific aspect of entity identification such as, but not limited to, identifying certain types of named entities (e.g., full names) or certain specific named entities (e.g., "Bryan Saxton"). In other words, the models may be trained for sub-tasks corresponding to certain aspects of entity identification rather than on the broader task of named entity recognition more generally.

In yet a further embodiment, the sub-task for each model (i.e., the sub-task for which task prefixes are added) corresponds to a respective entity (i.e., a respective named entity). As a non-limiting example, a first model may be trained using task prefixes corresponding to a first entity "Alice Apple," a second model may be trained using task prefixes corresponding to a second entity "Bob Banana," and a third model may be trained using task prefixes corresponding to a third entity "Charlie Cherries."

Moreover, the respective sub-tasks for any or all of the models may include identification of multiple entities. That is, the subset of entities corresponding to the task each model is fine-tuned to perform may be a single entity among a full set of entities or multiple entities of a subset of the full set of entities. As a non-limiting example, a finance-based model may be trained to identify multiple types of financial entities such as cost and price because these types of entities are often located in proximity to each other within documents and are therefore more effective for training models to perform financial entity identification when grouped together during training.

Training different models using different sets of prefix-added training contextual inputs therefore allows for fine-tuning the different models to perform different specific entity identification tasks, thereby breaking the larger task of entity identification used for named entity recognition into smaller sub-tasks which can be accomplished by a set of smaller models. These smaller models which are fine-tuned for a subset of entity identification tasks require fewer computing resources to solve their respective entity identification tasks.

In at least some implementations, smaller LLMs fine-tuned in this manner may be realized using standard, single processor (e.g., graphics processing unit, or GPU) hardware rather than requiring specialized, more powerful hardware. This may aid in allowing the disclosed techniques to be performed using a wider array of available hardware as well as improving scalability (e.g., by using techniques which can be performed on more kinds of hardware, those techniques can be more readily scaled using a wider variety of hardware than techniques which require specialized hardware).

Additionally, by using smaller sized models fine-tuned for respective sub-tasks in accordance with at least some disclosed embodiments, the models may be trained more quickly in order to support new types of entities. Moreover, generation of tokens for such models may be performed faster, thereby allowing the sub-task fine-tuned models to be used more efficiently.

In this regard, it is noted that large language models may have a very large model size which can include, for example, hundreds of billions of parameters. These models face challenges in being implemented on standard hardware used for many applications, and in particular, hardware frequently used in cloud computing solutions. Thus, LLMs may be impractical or impossible to implement when using such solutions. It has been identified that smaller, fine-tuned models trained on respective entity identification sub-tasks can be implemented on less powerful hardware and are capable of achieving comparable or better results in terms of accuracy of outputs than at least some solutions using general-purpose LLMs which have not been fine-tuned in this manner. Thus, the disclosed embodiments enable accurate classification of data in computing environments where such implementation would be previously impractical, and improves the efficiency of data classification.

At S350, the training contextual inputs are labeled. More specifically, the training contextual inputs may be labeled with respective labels in the form of corresponding prediction outputs. To this end, in an embodiment, labeling the training contextual inputs includes applying one or more pretrained models to the training contextual inputs in order to produce outputs to be used for the labeling. In a further embodiment, one or more pretrained LLMs are applied to the training contextual inputs in order to produce the outputs to be used for labeling.

In an embodiment, the labeling includes applying multiple language models and conducting a voting process, performing active labeling, or a combination thereof. The voting process may be utilized in order to determine labels based on outputs which are determined to have consensus among outputs of the multiple language models. The active labeling may include submitting at least some of the contextual inputs for labeling by a user, and may be utilized, for example, when automated labeling fails for one or more of the contextual inputs.

In an embodiment in which a voting process is conducted, multiple models (e.g., multiple LLMs) are applied to inputs (for example, the contextual inputs described above), and a voting process is conducted using the outputs of the models. If consent is reached among the models for a given input, then the input is labeled accordingly. For example, when a majority of the models output the same classification for the input, then the classification output by that majority of models is used as the label for that input. In some embodiments, if there is no consensus (for example, if no classification receives a majority of votes), then a negative label or no label may be applied for that input. Alternatively, the inputs for which consensus was not achieved may be provided to a human operator for manual labeling without needing to provide all of the inputs for manual labeling.

In a further embodiment using multiple models in a voting process, each of the models is queried with respect to the same entity in order to produce each set of outputs. That is, for each label to be voted upon, all of the models are queried with respect to the same entity for potential labeling. In yet a further embodiment, querying all models with respect to the same entity includes querying each of the models using the same contextual input. Any label determined via consensus based on outputs of the multiple models applied to the same contextual input may therefore be determined as the label to be applied to that contextual input. Alternatively, no label or a negative label may be applied (e.g., when the models fail to reach consensus when queried using a given contextual input).

Using multiple models may allow for improving automated labeling. That is, multiple language models may be utilized in order to determine labels, and consensus among multiple models may be utilized to improve the accuracy of the automatically created labels. Moreover, different language models having different strengths may be leveraged in order to further improve accuracy and make up for potential weaknesses which might be experienced using only one model. The result is that labeling may be performed in an automated fashion while maintaining accuracy of the resulting labels.

The active labeling may be performed using additional input provided manually by a user, and may be utilized to improve the accuracy of labeling by introducing a manual check as an additional layer of label accuracy check. In some embodiments, when the voting process fails to yield consensus for a given contextual input, that contextual input may be provided to a user for active labeling. Actively labeling only contextual inputs which fail to yield a consensus reduces the amount of contextual inputs which need to be manually labeled, thereby reducing the burden of manual labeling and allowing labeling to be completed faster. Additionally, contextual inputs which fail to yield consensus may be difficult for automated systems to accurately label such that submitting those contextual inputs for manual labeling may allow for improving accuracy of the resulting labeled training set and, consequently, of the model trained using such a labeled training set.

At S360, the model is trained using the training contextual inputs and corresponding labels. More specifically, the model may be trained using the set of prefix-added training contextual inputs and their respective labels. The resulting trained model is trained to make predictions of classifications for input portions of text and, in particular, classifications defined with respect to entities (i.e., nouns such as individuals, companies, organizations, legal entities, etc.).

In an embodiment, the trained model is trained to classify a given contextual input containing text indicating a candidate entity and surrounding text as either being a named entity input (i.e., an input including text indicating a particular individual or organization rather than a category or type of individual or organization) or not being a named entity input (i.e., an input which either does not actually indicate an entity or indicates an entity using a generic category or type which does not identify a specific entity). In a further embodiment, the trained model is configured to output one or more output portions of text.

The output portions of text may be or may include, but are not limited to, entity-indicating portions of text, where each entity-indicating portion of text indicates a respective named entity or type of named entity. In a further embodiment, the entity-indicating portions of text output by the trained model may include a portion of the input text corresponding to a named entity and optionally entity type portion of text. As a non-limiting example, an entity-indicating portion of text output by the trained model for an input text "of all the people working there, only John Wick was missing from" would be "PERSON: ['John Wick']," where "PERSON" is an entity type portion of text and "John Wick" is the portion of the input text corresponding to the named entity "John Wick."

At S370, it is checked whether more models are to be trained and, if so, execution continues with S340; otherwise, execution terminates. When multiple models are to be used, training may continue until each such model has been trained.

As noted above, in some embodiments, at each iteration of training, the training contextual inputs may be reconstructed by adding different task prefixes, for example task prefixes corresponding to a different task (e.g., identifying full names vs identifying given names or last names). Thus, in some such embodiments, execution continues with S340 where different task prefixes are added to the training contextual inputs to be used for training the next model.

Figure 4:
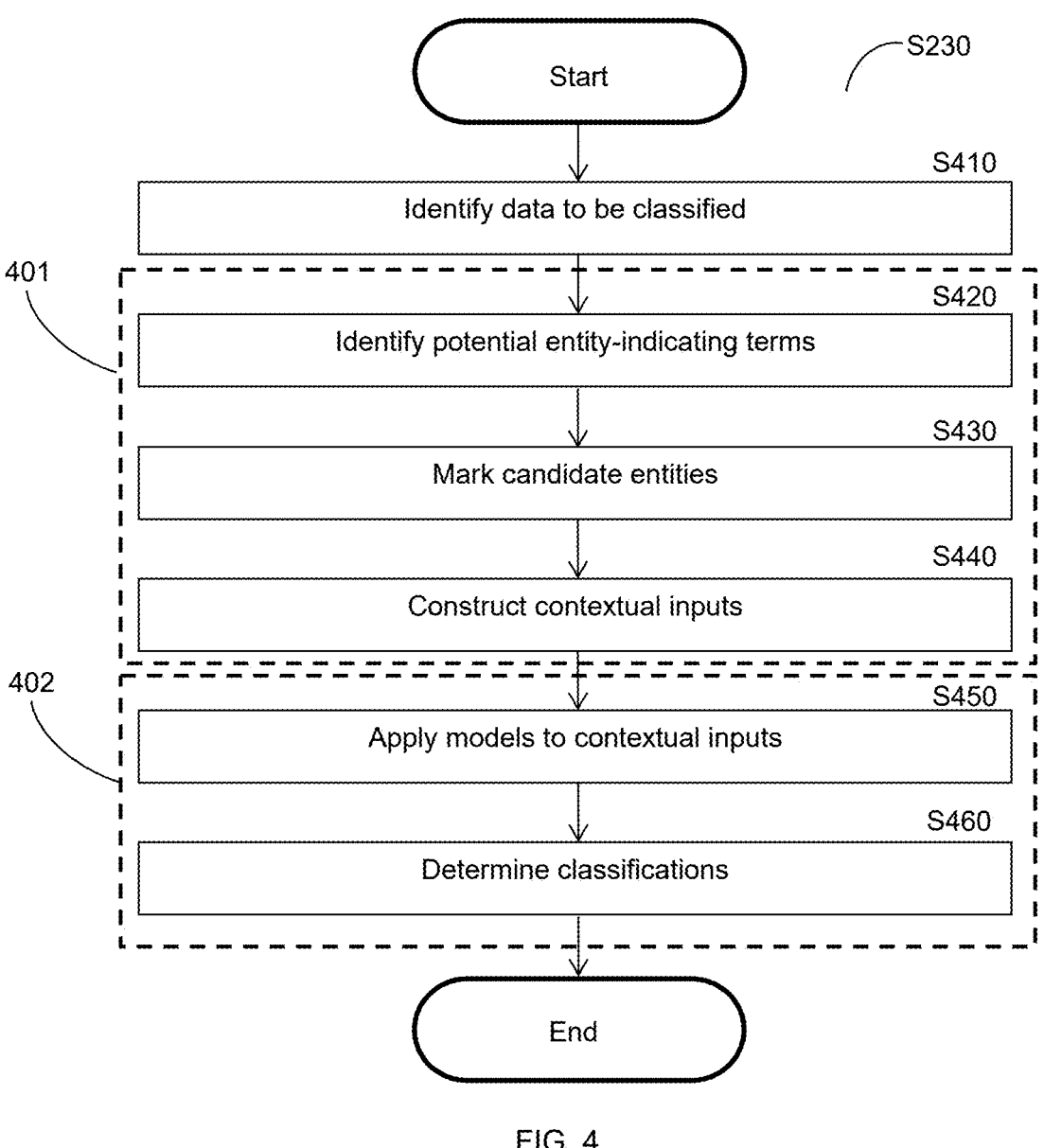
FIG. 4 is a flowchart illustrating a method for two-phase classification according to an embodiment.

FIG. 4 is a flowchart S230 illustrating a method for classification according to an embodiment.

At S410, data to be classified is identified. In an embodiment, the data to be classified is or includes text data and, in particular, text which may indicate one or more entities. In a further embodiment, the data to be classified is unstructured text data. As discussed herein, in some implementations, the data to be classified may be stored in one or more data stores of a computing environment such as, but not limited to, the computing environment 120, FIGS. 1A-B. Such a computing environment may store the data, either to provide a storage service or to process that data in order to provide other services. As a result, unauthorized access to data in such an environment may cause harm to servers, systems, software, finances, reputation, privacy, and more. Consequently, accurately classifying the data may aid in properly securing the computing environment, for example, by selecting security measures or checking for certain vulnerabilities and exposures depending on the classifications of the data in a given location.

In an embodiment, execution proceeds in two phases: a first phase 401 and a second phase 402. In a further embodiment, the first phase 401 may be a high recall phase, and the second phase 402 may be a high precision phase. In the embodiment depicted in FIG. 4, the first phase 401 begins with step S420 and the second phase 402 begins with step S450.

In yet a further embodiment, the two phases begin with a first phase which includes using a heuristic analysis to identify potential entity-indicating terms with high recall. Portions of text including these potential entity-indicating terms are used to construct contextual inputs for use during the second phase. In such an embodiment, after the first phase, execution proceeds with a second phase which includes applying one or more classifiers to the contextual inputs constructed during the first phase in order to classify the entities represented in respective contextual inputs with high precision.

By first applying a heuristic analysis to identify and isolate smaller portions of the data for respective candidate entities and then applying the classifiers to those smaller portions of data (i.e., the contextual inputs), technical challenges related to processing data using machine learning caused by limitations of certain kinds of models may be overcome. As a particular example, as noted above, LLMs tend to have limited input sizes. This limit on input size makes processing larger batches of text using LLMs challenging. The heuristic analysis performed in the first phase may be performed using a less restrictive analysis process, thereby enabling the second phase in which classifiers configured for named entity recognition such as LLMs fine-tuned for such named entity recognition analysis are applied to the isolated portions of text in the form of the contextual inputs.

Additionally, certain machine learning models may take a long time to process larger sets of data and may use a large amount of computing resources in order to generate and process tokens used for language analysis. Using a first phase of heuristic analysis in order to streamline construction of inputs for the classifiers therefore enables reducing the time and computational resources needed to apply machine learning classifiers, particularly complex machine learning models such as LLMs. In other words, by using the heuristic analysis to identify a subset of data as potentially containing entity-indicating terms, the amount of data to be processed using a more computationally intensive process is reduced, thereby conserving computing resources and reducing the total amount of time as compared to at least some other solutions in which classifiers are applied to the text directly in addition to enabling application of models which cannot be applied to the text directly (e.g., due to limits on input size).

At S420, one or more potential entity-indicating terms are identified within the data. In an embodiment, identifying the potential entity-indicating terms includes applying one or more entity identification rules which are defined in order to identify terms among text which might indicate or otherwise represent an entity. Such an entity may be represented within the text as a noun, and may optionally be further represented by one or more modifiers (e.g., one or more adjectives which may further describe the entity or be part of the entity's name or brand).

In an embodiment, identifying the potential entity-indicating terms includes performing one or more heuristic analyses such as, but not limited to, analyses based on regular expression (regex), analyses based on support terms, analyses using entity-specific dictionaries, or a combination thereof. In a further embodiment, such heuristics may be defined in order to provide a high percent coverage of potential entity-indicating terms, i.e., high recall. In other words, the heuristics may be optimized to identify the maximum amount of potential entity-indicating terms. To this end, the applied entity identification rules define the heuristic analysis, for example but not limited to, by defining a set of if-then statements to be used to heuristically analyze whether a given portion of text includes an entity.

In a further embodiment, the heuristic analysis may be realized further using a truth table. In such an embodiment, identifying the potential entity-indicating terms further includes applying the truth table to the data. In yet a further embodiment, the truth table includes columns representing a set of heuristic factors as well as a column including score outputs. The heuristic factors may include the number of validated instances of each sample (e.g., instances validated using one or more validation algorithms such as LUHN validation), the strength of a regular expression of each sample, a context of each sample within the dataset, a number of samples having the same pattern as each sample, and a degree of uniqueness of each sample. The context of each sample is determined with respect to supportive terms and unsupportive terms, where supportive terms are terms that support a particular classification included in portions of the dataset that are proximate to a given sample and unsupportive terms are terms that suggest away from a particular classification included in portions of the dataset that are proximate to the sample. Additionally, classifications of other portions of the dataset may be utilized to increase or decrease a probability that a classification is accurate, thereby improving the classification further. The score outputs of the truth table each represent a respective likelihood that a particular classification is correct.

At S430, candidate entities within the data are marked. In an embodiment, text representing the candidate entities may be marked with respective tags or other metadata indicating that the text representing the candidate entity is a first portion of entity-indicating text.

In an embodiment, S430 further includes marking the surrounding text for the candidate entities. More specifically, one or more second portions of surrounding text which each appear before or after the first portion of entity-indicating text may be identified and marked with respective tags or other metadata indicating that the second portions of text are surrounding text and, optionally, to which portion of entity-indicating text each portion of surrounding text belongs to (e.g., which portion of entity-indicating text is the portion of surrounding text adjacent to, within a threshold distance of, etc.). Marking the text representing the candidate entities and, optionally, the surrounding text in this manner adds further context beyond whether each portion of data contains a potential (i.e., candidate) entity. That is, such additional context includes identifying which sub portions of that portion of text represent a candidate entity and which represent the surrounding text around the candidate entity text.

At S440, contextual inputs are constructed based on the marked text. More specifically, each contextual input includes one or more portions of text marked with respective candidate entities as well as one or more surrounding portions of text (e.g., text marked as surrounding text or text which is otherwise adjacent to or within a threshold distance of the text marked with a candidate entity).

At S450, one or more models are applied to the contextual inputs. In an embodiment, each model applied to the contextual inputs is a machine learning classifier trained to perform entity identification tasks such as, but not limited to, named entity recognition of certain named entities or types of named entities as discussed above. In a further embodiment, each model is a language model configured to output entity-indicating text based on input text which includes text representing one or more named entities. In various embodiments, any or all of the models may be large language models (LLMs). In an embodiment, any or all of the models applied to the contextual inputs are trained as described above with respect to FIG. 3.

As noted above, in some embodiments, multiple fine-tuned models may be used.

More specifically, in some such embodiments, each model is fine-tuned using a respective set of task prefixes corresponding to a respective entity identification sub-task such as, but not limited to, identification of one or more entities or types of entities. As also noted above, applying multiple fine-tuned models to the contextual inputs in this manner allows for processing the contextual inputs faster and more efficiently than at least some solutions using general purpose or otherwise larger models (e.g., larger in terms of number of parameters).

At S460, classifications are determined for the contextual inputs based on the outputs of the models. In some implementations, each model outputs one or more portions of text indicating respective entities or a null entity. That is, given an input text, each model outputs one or more entity values indicating which entity or entities were identified within the input text, or that no entity the model recognizes was identified within the input text. To this end, in such an embodiment, determining the classification for each contextual input includes analyzing the outputs of the models for the contextual input in order to determine one or more entities identified within the contextual input.

Figure 5:
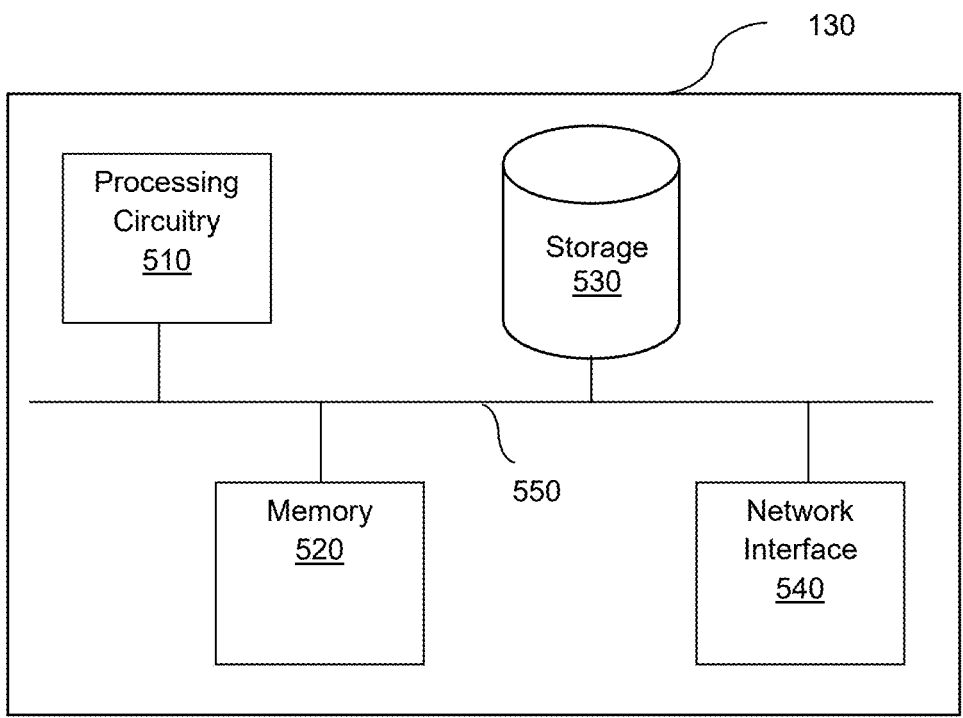
FIG. 5 is a schematic diagram of a name extractor according to an embodiment.

FIG. 5 is an example schematic diagram of a name extractor 130 according to an embodiment. The name extractor 130 includes a processing circuitry 510 coupled to a memory 520, a storage 530, and a network interface 540. In an embodiment, the components of the name extractor 130 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 520 may be volatile (e.g., random access memory, etc.), non-volatile (e.g., read only memory, flash memory, etc.), or a combination thereof.

In one configuration, software for implementing one or more embodiments disclosed herein may be stored in the storage 530. In another configuration, the memory 520 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 510 to perform the various processes described herein.

The storage 530 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 540 allows the name extractor 130 to communicate with other systems, devices, components, applications, or other hardware or software components, for example as described herein.

It should be understood that the embodiments described herein are not limited to the specific architecture illustrated in FIG. 5, and other architectures may be equally used without departing from the scope of the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various embodiments disclosed herein can be implemented as hardware, firmware, software, or any combination thereof. Moreover, the software may be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for classification, comprising:

identifying a plurality of candidate entities among text data by applying at least one entity identification rule to the text data;

constructing a plurality of inputs based on the identified plurality of candidate entities, wherein each input includes a first portion of text indicating a candidate entity from among the plurality of candidate entities and at least one second portion of text, wherein the at least one second portion of text of each input is adjacent to the first portion of text of the input;

applying a plurality of language models to the plurality of inputs, wherein each language model is trained to identify a respective set of at least one entity, wherein outputs of the plurality of language models include at least one portion of entity-indicating text for each input; and determining, based on the outputs of the plurality of language models, at least one named entity in the text data.

2. The method of claim 1, wherein applying the at least one entity identification rule further comprises:

identifying at least one entity-indicating term within the text data by applying a truth table to the text data, wherein the truth table includes a plurality of columns representing a set of factors and a column including a plurality of score outputs, wherein the plurality of candidate entities are identified based on the identified at least one entity-indicating term.

3. The method of claim 2, further comprising:

marking the first portion of text indicating the candidate entity for each input based on results of applying the truth table to the text data, wherein the plurality of inputs are constructed based further on the marked first portion of text for each input.

4. The method of claim 1, further comprising:

matching, for each input, between the candidate entity of the input and at least one classification output by the plurality of language models based on the input in order to determine a distance between the candidate entity and each of the at least one classification for each input, wherein the at least one named entity is determined based further on the distance determined for each input.

5. The method of claim 4, wherein the matching includes comparing each distance to a threshold.

6. The method of claim 3, further comprising:

training the plurality of language models using a plurality of sets of training data, wherein the set of training data used to train each language model includes a plurality of training inputs and a plurality of corresponding training task outputs of the at least one entity of each language model, wherein each training input includes a first portion of training text indicating a training candidate entity and at least one second portion of training text which is adjacent to the first portion of training text.

7. The method of claim 6, further comprising:

adding a plurality of task prefixes to the plurality of training inputs, wherein the plurality of language models is trained using the plurality of training inputs with the added plurality of task prefixes.

8. The method of claim 6, wherein the plurality of language models is a plurality of first language models, further comprising:

labeling the plurality of training inputs with the plurality of corresponding training task outputs, wherein labeling the plurality of training inputs further includes applying at least one second language model to the plurality of training inputs.

9. The method of claim 8, wherein the at least one second language model is a plurality of second language models, further comprising:

applying the plurality of second language models in a voting process, wherein outputs receiving a majority of votes from the plurality of second language models are used as the plurality of corresponding training task outputs for labeling the plurality of training inputs.

10. The method of claim 1, wherein each language model is trained using a respective set of training text inputs, wherein each language model is configured to only generate text predictions from among the respective set of training text inputs used to train the language model.

11. The method of claim 1, wherein each language model is fine-tuned only for entity extraction.

12. A non-transitory computer readable medium having stored thereon instructions for causing a processing circuitry to execute a process, the process comprising:

identifying a plurality of candidate entities among text data by applying at least one entity identification rule to the text data;

constructing a plurality of inputs based on the identified plurality of candidate entities, wherein each input includes a first portion of text indicating a candidate entity from among the plurality of candidate entities and at least one second portion of text, wherein the at least one second portion of text of each input is adjacent to the first portion of text of the input;

applying a plurality of language models to the plurality of inputs, wherein each language model is trained to identify a respective set of at least one entity, wherein outputs of the plurality of language models include at least one portion of entity-indicating text for each input; and determining, based on the outputs of the plurality of language models, at least one named entity in the text data.

13. A system for classification, comprising:

a processing circuitry; and a memory, the memory containing instructions that, when executed by the processing circuitry, configure the system to:

identify a plurality of candidate entities among text data by applying at least one entity identification rule to the text data;

construct a plurality of inputs based on the identified plurality of candidate entities, wherein each input includes a first portion of text indicating a candidate entity from among the plurality of candidate entities and at least one second portion of text, wherein the at least one second portion of text of each input is adjacent to the first portion of text of the input;

apply a plurality of language models to the plurality of inputs, wherein each language model is trained to identify a respective set of at least one entity, wherein outputs of the plurality of language models include at least one portion of entity-indicating text for each input; and determining, based on the outputs of the plurality of language models, at least one named entity in the text data.

14. The system of claim 13, wherein the system is further configured to:

identify at least one entity-indicating term within the text data by applying a truth table to the text data, wherein the truth table includes a plurality of columns representing a set of factors and a column including a plurality of score outputs, wherein the plurality of candidate entities are identified based on the identified at least one entity-indicating term.

15. The system of claim 14, wherein the system is further configured to:

mark the first portion of text indicating the candidate entity for each input based on results of applying the truth table to the text data, wherein the plurality of inputs are constructed based further on the marked first portion of text for each input.

16. The system of claim 13, wherein the system is further configured to:

match, for each input, between the candidate entity of the input and at least one classification output by the plurality of language models based on the input in order to determine a distance between the candidate entity and each of the at least one classification for each input, wherein the at least one named entity is determined based further on the distance determined for each input.

17. The system of claim 16, wherein the matching includes comparing each distance to a threshold.

18. The system of claim 15, wherein the system is further configured to:

train the plurality of language models using a plurality of sets of training data, wherein the set of training data used to train each language model includes a plurality of training inputs and a plurality of corresponding training task outputs of the at least one entity of each language model, wherein each training input includes a first portion of training text indicating a training candidate entity and at least one second portion of training text which is adjacent to the first portion of training text.

19. The system of claim 18, wherein the system is further configured to:

add a plurality of task prefixes to the plurality of training inputs, wherein the plurality of language models is trained using the plurality of training inputs with the added plurality of task prefixes.

20. The system of claim 18, wherein the plurality of language models is a plurality of first language models, wherein the system is further configured to:

label the plurality of training inputs with the plurality of corresponding training task outputs, wherein labeling the plurality of training inputs further includes applying at least one second language model to the plurality of training inputs.

21. The system of claim 20, wherein the at least one second language model is a plurality of second language models, wherein the system is further configured to:

apply the plurality of second language models in a voting process, wherein outputs receiving a majority of votes from the plurality of second language models are used as the plurality of corresponding training task outputs for labeling the plurality of training inputs.

22. The system of claim 13, wherein each language model is trained using a respective set of training text inputs, wherein each language model is configured to only generate text predictions from among the respective set of training text inputs used to train the language model.

23. The system of claim 13, wherein each language model is fine-tuned only for entity extraction.

* * * * *